(12) United States Patent
Shen et al.

(10) Patent No.: US 11,992,053 B2
(45) Date of Patent: May 28, 2024

(54) VAPORIZING APPARATUS AND VAPORIZER THEREOF

(71) Applicant: Polytronics Technology Corp., Hsinchu (TW)

(72) Inventors: Po-Chih Shen, Kaohsiung (TW); Tong Cheng Tsai, Tainan (TW); Yu Sian Jhou, New Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 501 days.

(21) Appl. No.: 17/144,821

(22) Filed: Jan. 8, 2021

(65) Prior Publication Data

US 2022/0104549 A1    Apr. 7, 2022

(30) Foreign Application Priority Data

Oct. 7, 2020    (TW) .................. 109134676

(51) Int. Cl.
*A24F 40/46* (2020.01)
*A24F 40/44* (2020.01)

(52) U.S. Cl.
CPC .............. *A24F 40/46* (2020.01); *A24F 40/44* (2020.01)

(58) Field of Classification Search
CPC .... A24F 40/10; A24F 44/46; H05B 2203/021
See application file for complete search history.

(56) References Cited

U.S. PATENT DOCUMENTS

2022/0132930 A1* 5/2022 Huang et al. ........... A24F 40/46
2023/0046602 A1* 2/2023 Taurino et al. ....... A24F 40/465

FOREIGN PATENT DOCUMENTS

| CN | 106579564 A | 4/2017 |
| CN | 109414078 A | 3/2019 |
| CN | 210158014 U | 3/2020 |
| CN | 210203364 U | 3/2020 |
| CN | 111053291 A | 4/2020 |
| CN | 210329343 U | 4/2020 |
| TW | M590368 U | 2/2020 |
| WO | WO2020177131 A1 | 9/2020 |

* cited by examiner

*Primary Examiner* — Christopher M Rodd
*Assistant Examiner* — Ronnie Kirby Jordan
(74) *Attorney, Agent, or Firm* — MUNCY, GEISSLER, OLDS & LOWE, P.C.

(57) ABSTRACT

A vaporizer comprises an absorber, a heating element, and a porous cover layer. The absorber is configured to absorb a material to be vaporized. The heating element is configured to heat and vaporize the material to be vaporized in the absorber, and includes a first electrode portion, a second electrode portion, and an electrically conductive connecting member connected between the first electrode portion and the second electrode portion. The porous cover layer covers at least a portion of the heating element without covering the first and second electrode portions. A ratio of an area of the porous cover layer to an area of the electrically conductive connecting member is defined as a covering ratio, which is at least 50%. A porosity of the porous cover layer ranges from 30% to 75%.

11 Claims, 5 Drawing Sheets

VAPORIZING APPARATUS AND VAPORIZER THEREOF

BACKGROUND OF THE INVENTION

(1) Field of the Invention

The present application relates to a vaporizing apparatus and a vaporizer thereof.

(2) Description of the Related Art

Traditional cigarettes take up a large space and are easily deformed or damaged when being carried. The users often need to find shops selling cigarettes when going outside for a long time. Traditional cigarettes need to be lighted by fire and generates waste like ash and cigarette butts. Therefore, ashtrays or specific trash cans are necessary to receive the wastes to avoid environmental contamination or fire.

To solve the above problems, personal vaporizing apparatuses such as electronic cigarettes have been widely developed for a decade as a substitute for cigarettes and cigars. Electronic cigarettes are usually sophisticated, and thus young people like to use them to show personal taste. The vaporizing apparatuses are developed continuously to increase efficiency and reliability and to lower manufacturing difficulty and cost.

An electronic cigarette usually uses a porous ceramic material to absorb cigarette oil that is the so-called e-liquid or e-juice and a heater to heat and vaporize the cigarette oil. The heater is usually made of metal or metal alloy, and the heater may heat up to have a temperature up to 200° C.-400° C. However, with exposure to air for a long period of time, an oxidation film is formed on surface of the heater, and thus properties of the heater serving as a resistor is degraded, resulting in decrease of power endurance. In addition, more times an electronic cigarette is used, more likely heater is fatigued. After using an electronic cigarette hundreds of times, users gradually find that the electronic cigarette has drawbacks like insufficient amount and bland smell of smoke, and ever worse, the electronic cigarette does not work or malfunctions. Therefore, traditional electronic cigarettes do not have a long lifetime and need to be improved.

SUMMARY OF THE INVENTION

The present application provides a vaporizing apparatus and a vaporizer thereof in which a porous cover layer having a suitably predetermined porosity is included to cover a heating element, such that the vaporizing apparatus and the vaporizer thereof have increased power endurance, and lifetime thereof is extended as well. Also, a large amount and rich taste smell of smoke are obtained.

In accordance with a first aspect of the present application, the present application discloses a vaporizer comprising an absorber, a heating element, and a porous cover layer. The absorber is configured to absorb a material to be vaporized. The heating element is configured to heat and vaporize the material to be vaporized in the absorber, and includes a first electrode portion, a second electrode portion, and an electrically conductive connecting member connected between the first electrode portion and the second electrode portion. The porous cover layer covers at least a portion of the heating element without covering the first and second electrode portions. A ratio of an area of the porous cover layer to an area of the electrically conductive connecting member is defined as a covering ratio, which is at least 50%. A porosity of the porous cover layer ranges from 30% to 75%.

In an embodiment, a material of the porous cover layer is selected from aluminum oxide, silicon carbide, sodium silicate, ferrite, active carbon, kaolinite, halloysite, montmorillonite, calcium phosphate, zeolite, vermiculite, diatomite, palygorskite, sepiolite, perlite, or any combination thereof.

In an embodiment, the covering ratio is in a range of 50%-800%.

In an embodiment, the porous cover layer has a rectangular shape.

In an embodiment, an upper edge of the porous cover layer is distanced from an upper edge of the absorber by a gap D, and a lower edge of the porous cover layer is distanced from a lower edge of the absorber by the gap D; and wherein the gap D is 0.1 mm-0.6 mm.

In an embodiment, the porous cover layer extends along the electrically conductive connecting member and covers all portions of the electrically conductive connecting member.

In an embodiment, the porous cover layer covers entirety of a bottom surface of the absorber without covering the first and second electrode portions.

In an embodiment, the porous cover layer has a thickness of 10 μm-200 μm.

In an embodiment, the porosity of the porous cover layer is 45%-75%.

In accordance with a second aspect of the present application, the present application discloses a vaporizing apparatus comprising a housing, an absorber, a heating element, a porous cover layer, and a battery. The housing encloses a reservoir for storing a material to be vaporized. The absorber is configured to absorb the material to be vaporized. The heating element is configured to heat and vaporize the material to be vaporized in the absorber, and includes a first electrode portion, a second electrode portion, and an electrically conductive connecting member connected between the first electrode portion and the second electrode portion. The porous cover layer covers at least a portion of the heating element without covering the first and second electrode portions. A ratio of an area of the porous cover layer to an area of the electrically conductive connecting member is defined as a covering ratio. The covering ratio is at least 50%. A porosity of the porous cover layer ranges from 30% to 75%. The battery provides power to the heating element.

In an embodiment, a material of the porous cover layer is selected from aluminum oxide, silicon carbide, sodium silicate, ferrite, active carbon, kaolinite, halloysite, montmorillonite, calcium phosphate, zeolite, vermiculite, diatomite, palygorskite, sepiolite, perlite, or any combination thereof.

In an embodiment, the covering ratio is in a range of 50%-800%.

In an embodiment, the porous cover layer has a rectangular shape.

In an embodiment, an upper edge of the porous cover layer is distanced from an upper edge of the absorber by a gap D, and a lower edge of the porous cover layer is distanced from a lower edge of the absorber by the gap D; and wherein the gap D is 0.1 mm-0.6 mm.

In an embodiment, the porous cover layer extends along the electrically conductive connecting member and covers all portions of the electrically conductive connecting member.

In an embodiment, the porous cover layer covers entirety of a bottom surface of the absorber without covering the first and second electrode portions.

In an embodiment, the porous cover layer has a thickness of 10 μm-200 μm.

Both the vaporizing apparatus and the vaporizer of the present application comprise a porous cover layer having a suitably predetermined porosity to cover a heating element. Therefore, the present application solves the problem that surface of the heating element is oxidized, such that the vaporizing apparatus and the vaporizer thereof have increased power endurance, and lifetime thereof is extended as well. Moreover, a large amount and rich taste smell of smoke can be obtained to provide a solution for current electronic cigarettes.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed below in detail. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
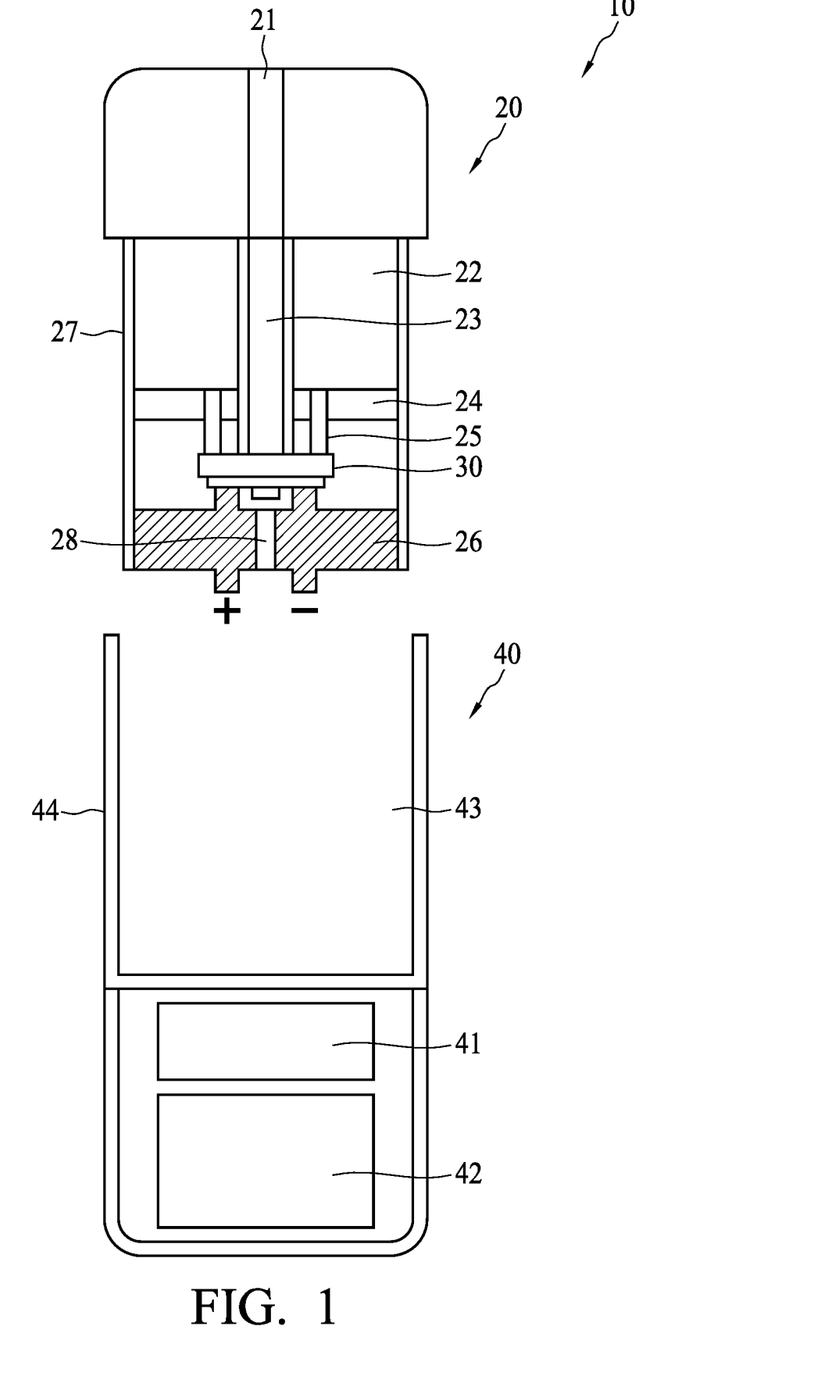
FIG. 1 shows a vaporizing apparatus in accordance with an embodiment of the present application.

FIG. 1 shows a vaporizing apparatus 10 which can be applied to an electronic cigarette. The vaporizing apparatus 10 may be in a flat or cylindrical shape and comprises a suction nozzle 20 and a power supply 40. The power supply 40 has a cavity 43 to receive a main portion of the suction nozzle 20 and is combined with the suction nozzle 20. Accordingly, the suction nozzle 20 is replaceable.

The suction nozzle 20 comprises an outlet channel 21, a reservoir 22, a smoke channel 23, an isolating member 24, liquid channels 25, an electrode set 26, a housing 27, an air inlet channel 28 and a vaporizer 30. The reservoir 22 stores the material or liquid to be vaporized, e.g., e-liquid or e-juice. In an embodiment, the reservoir 22 can be a room or space enclosed and constituted by the housing 27 and the isolating member 24 to accommodate the material or liquid to be vaporized. The isolating member 24 comprises two liquid channels 25 connecting the reservoir 22 and the vaporizer 30. The material or liquid can flow through the liquid channels 25 to be in contact with the vaporizer 30 for being vaporized. The electrode set 26 is an interface to provide power to heat the vaporizer 30. The electrode set 26 includes the air inlet channel 28 to allow air to pass therethrough. The power supply 40 includes a control circuit 41, a battery 42 and a is housing 44. The housing 44 constitutes the cavity 43 to receive the suction nozzle 20. The control circuit 41 determines the timing of the battery 42 to provide heating power to the vaporizer 30.

Figure 2:
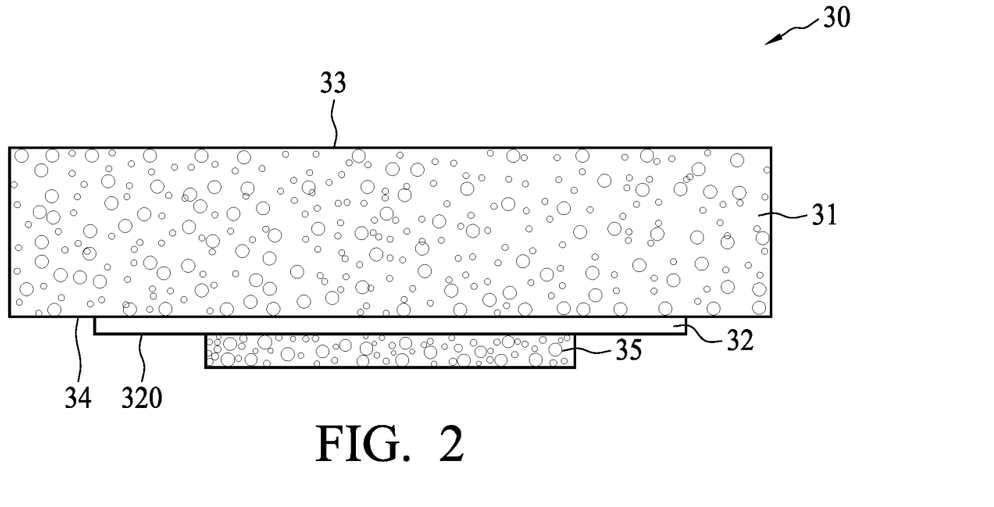
FIG. 2 shows a lateral view of a vaporizer in accordance with an embodiment of the present application.
Figure 3:
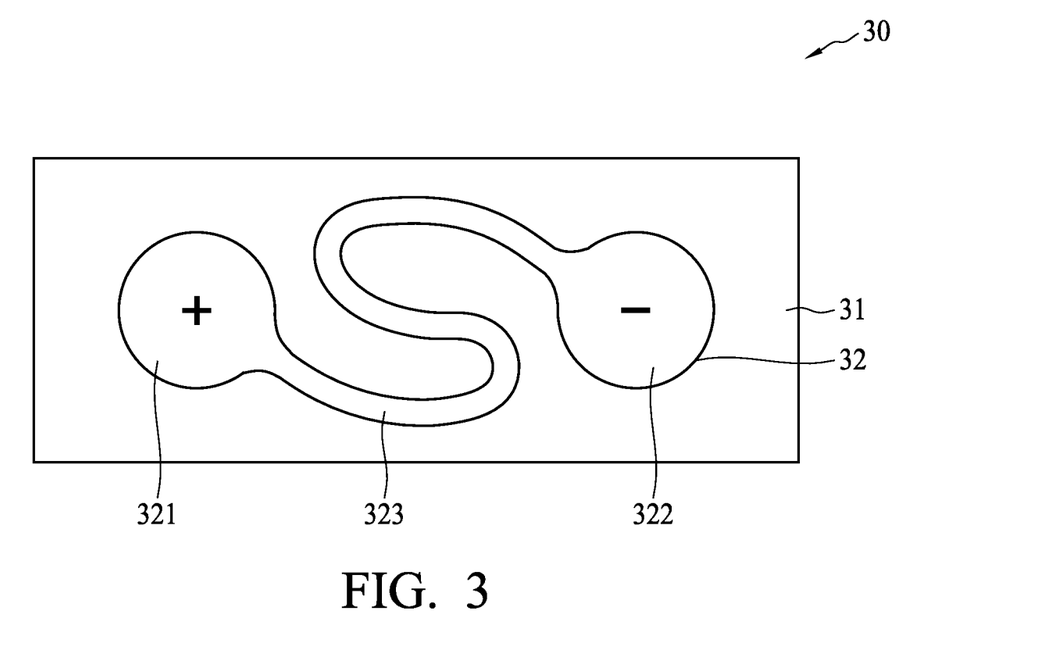
FIG. 3 shows a bottom view of the vaporizer in FIG. 2.

FIG. 2 shows a lateral view of the vaporizer 30 in accordance with an embodiment of the present application. FIG. 3 is a bottom view of the vaporizer 30. For ease of description, a porous cover layer is omitted in FIG. 3. The vaporizer 30 is of a laminated structure, and comprises an absorber 31, a heating element 32, and a porous cover layer 35. The heating element 32 is disposed between the absorber 31 and the porous cover layer 35. The absorber 31 comprises a first surface 33 and a second surface 34. The first surface 33 and the second surface 34 are at opposite sides of the absorber 31. In an embodiment, a material to be vaporized is in direct contact with the first surface 33 and the heating element 32 is in direct contact with the second surface 34. The heating element 32 may be a resistor-type heater using ceramic core in which the heating is not linearly proportional to time. The absorber 31 usually comprises a plurality of porous material layers. For manufacturing the absorber 31, a great many of pore formers are added to mix with ceramic powders, and by adjusting size and volume percentage (vol %) of pore formers, a suitably predetermined porosity for each of the porous material layers is obtained. Thereafter, because the plurality of porous material layers are pressed and sintered at a high temperature, the pore formers form a large number of pores in the resulting absorber 31 due to evaporation of the pore formers at high temperature. The heating element 32 may comprises silver (Ag), ruthenium (Ru), silver-palladium alloy (Ag—Pd), nickel-chromium alloy (Ni—Cr), or copper-nickel alloy (Cu—Ni). The porous cover layer 35 covers at least a portion of the heating element 32. That is, the porous cover layer 35 overlaps the heating element 32 without covering the electrode portions of the heating element 32. Detailed description for this will be provided below. The porous cover layer 35 may be made of ceramic or other porous materials, including but not limited to aluminum oxide ($Al_2O_3$), silicon carbide (SiC), sodium silicate ($Na_2SiO_3$), ferrite, active carbon, kaolinite, halloysite, montmorillonite, calcium phosphate, zeolite, vermiculite, diatomite, palygorskite, sepiolite, perlite, or any combination thereof. For manufacturing the porous cover layer 35, likewise, a great many of pore formers are added to mix with ceramic powders, and by adjusting size and volume percentage (vol %) of pore formers, a slurry is produced after the mixing step. Next, a metal or a metal alloy to produce the heating element 32 is formed on the absorber by thick-film printing, coating, sputtering, spray printing, or transfer printing. Then, the slurry is coated or printed to cover the heating element 32. Finally, the vaporizer 30 is entirely put into a sintering furnace to proceed with a co-firing step. Accordingly, the pore formers in the slurry form a large number of pores in the resulting porous cover layer 35 due to evaporation under high temperatures, and in the meanwhile, the absorber 31, the heating element 32, and the porous cover layer 35 are tightly bonded to each other. Such a porous cover layer 35 has a suitably predetermined porosity.

Both the absorber 31 and the porous cover layer 35 are made of porous material having a large number of pores, in which porosities of the two layers could be the same or different. For having the vaporizer 30 have a sufficient mechanical strength to avoid deformation during manufacturing process of electronic cigarette or after multi-times of use of electronic cigarette, a mechanical strength of the absorber 31 is preferably greater than 10 N/mm², or greater than 15 N/mm² in particular. The porosity of the absorber 31 which could satisfy this mechanical strength may range from 45% to 75%, such as 50%, 60%, or 70%.

Please further refer to FIG. 3. According to the present application, the heating element 32 includes a first electrode portion (e.g., a positive electrode) 321, a second electrode portion (e.g., a negative electrode) 322, and an electrically conductive connecting member (i.e., a wiring line) 323. The electrically conductive connecting member 323 is disposed between the first electrode portion 321 and the second electrode portion 322, and is connected to the first electrode portion 321 and the second electrode portion 322. The first and second electrode portions 321 and 322 are generally of a circular shape. The electrically conductive connecting member 323 is configured to connect with the first and second electrode portions 321 and 322, and forms an electrically conductive wiring line therebetween. The heating element 32 may be formed on a bottom surface 320 of the absorber 31 by printing, for example, in a way to make the first electrode portion 321 and the second electrode portion 322 be substantially located at two sides of the absorber 31. In other words, with respect to a longitudinal central line or a lateral central line of the absorber 31, the first electrode portion 321 and the second electrode portion 322 are substantially symmetric to each other on the bottom surface 320 of the absorber 31. In addition to printing, the heating element may be made of a metal sheet comprising metal or metal alloy, which is attached to the bottom surface 320 of the absorber 31 by mechanical pressing. No matter how the heating element 32 is produced, it has an integral one-piece structure.

Figure 4A:
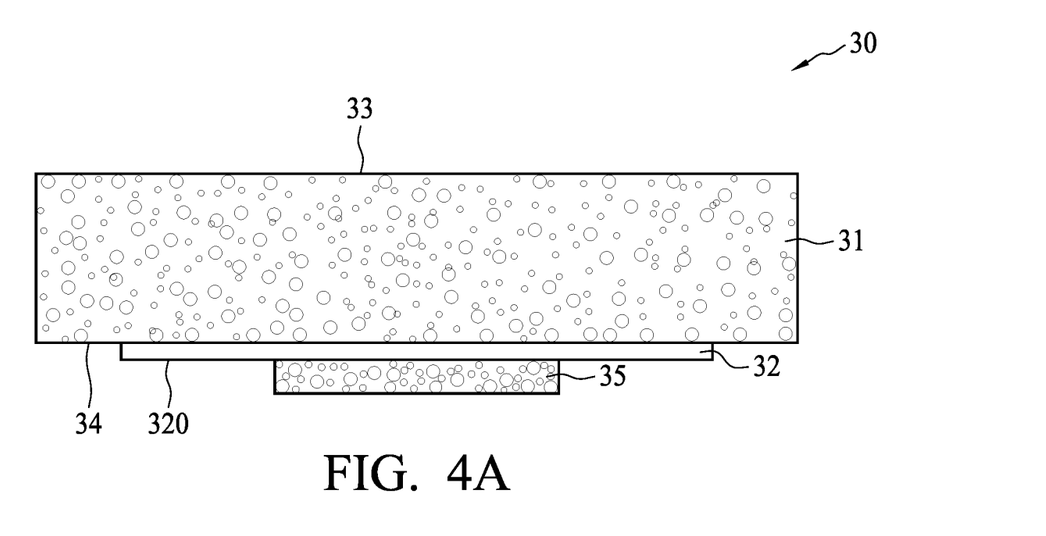
FIGS. 4A and 4B show a vaporizer in accordance with a first embodiment of the present application.
Figure 4B:
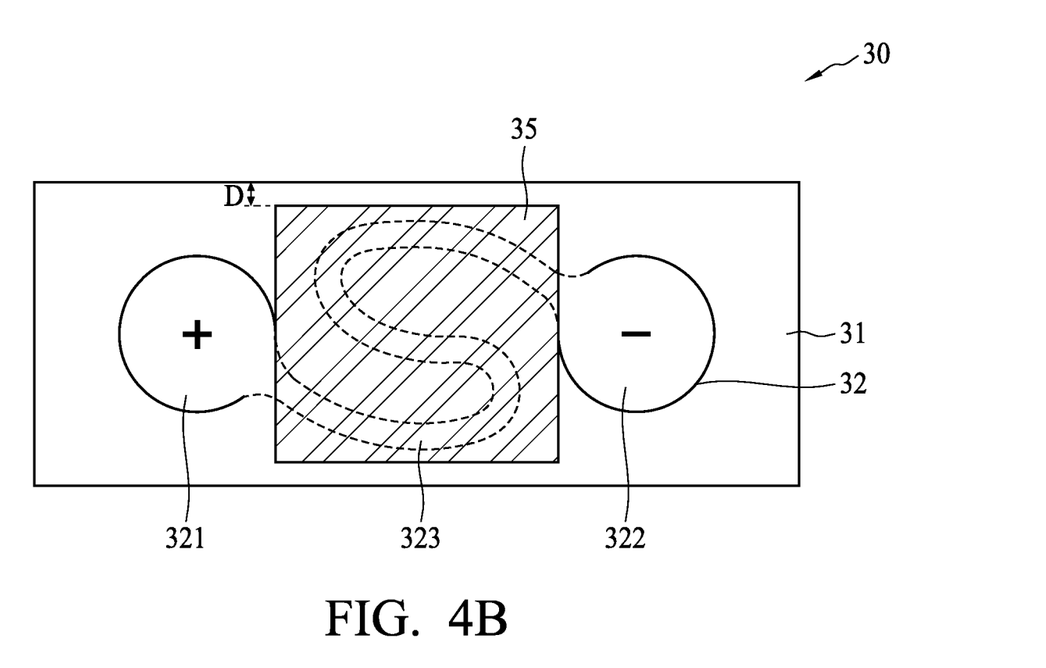

Please refer to FIGS. 4A and 4B. FIG. 4A is a lateral side view of a vaporizer in accordance with a first embodiment of the present application, and FIG. 4B is a bottom view of the vaporizer in FIG. 4A. In the present embodiment, the porous cover layer 35 has a generally rectangular shape when viewed from the bottom thereof, and the porous cover layer 35 covers the electrically conductive connecting member 323. Because the porous cover layer 35 protects the electrically conductive connecting member 323 from contacting moisture and oxygen in air, oxidation of the heating element 32 made of metal or metal alloy is avoided, so as to extend lifetime of the vaporizer 30. Moreover, oxidation of the heating element 32 is avoided, therefore power endurance of the vaporizer 30 is increased. Compared to traditional electronic cigarettes, the electronic cigarette of the present application can endure higher power applied thereto. Accordingly, users could select and push a power selection button on the electronic cigarette based on his need, and enjoy sensual enjoyment of a large amount of smoke and rich taste smell.

Please note that the electrode set 26 provides power to heat the is vaporizer 30. (See FIG. 1.) Thus, the electrode set 26 has to contact the first electrode portion 321 and the second electrode portion 322 to heat the electrically conductive wiring line (regarded as a resistor) comprising the first electrode portion 321, the electrically conductive connecting member 323, and the second electrode portions 322. For this reason, the porous cover layer 35 cannot cover the first and second electrode portions 321 and 322. In case the first and second electrode portions 321 and 322 are covered by the porous cover layer 35 being of electrically insulative material, the product could be defective. The product may have the problem of poor contact problem or non-operation issue.

In the manufacturing step of coating or printing the slurry onto the absorber 31 to form the porous cover layer 35, misalignment may cause the slurry overflowing and extending beyond an upper and/or lower edge of the absorber 31. To solve this misalignment problem, coating or printing area of the slurry could be slightly reduced, and after a drying step, the slurry will have a basically rectangular shape, and the upper edge of the porous cover layer 35 is distanced from the upper edge of the absorber 31 by a gap D, as shown in FIG. 4B Similarly, the lower edge of the porous cover layer 35 is distanced from the lower edge of the absorber 31 by the gap D. In an embodiment, the gap D is 0.1 mm-0.6 mm, such as 0.2 mm, 0.3 mm, 0.4 mm, or 0.5 mm in particular. In case the slurry overflows and extends beyond the upper and/or lower edge of the absorber 31 and thus overlays the side surface of the absorber 31, cigarette oil absorbing efficiency of the absorber 31 and heating efficient of the heating element 32 are influenced, having unfavorable impact on smoke amount and taste smell.

In the present application, a ratio of an area of the porous cover layer 35 to an area of the electrically conductive connecting member 323 (i.e., the percentage of the porous cover layer 35 overlaying the electrically conductive connecting member 323) is defined as a covering ratio. In the first embodiment in FIG. 4B, the porous cover layer 35 has a generally rectangular shape and there is a gap D in such a structural design, in which is the covering ratio is about 300%.

Figure 5:
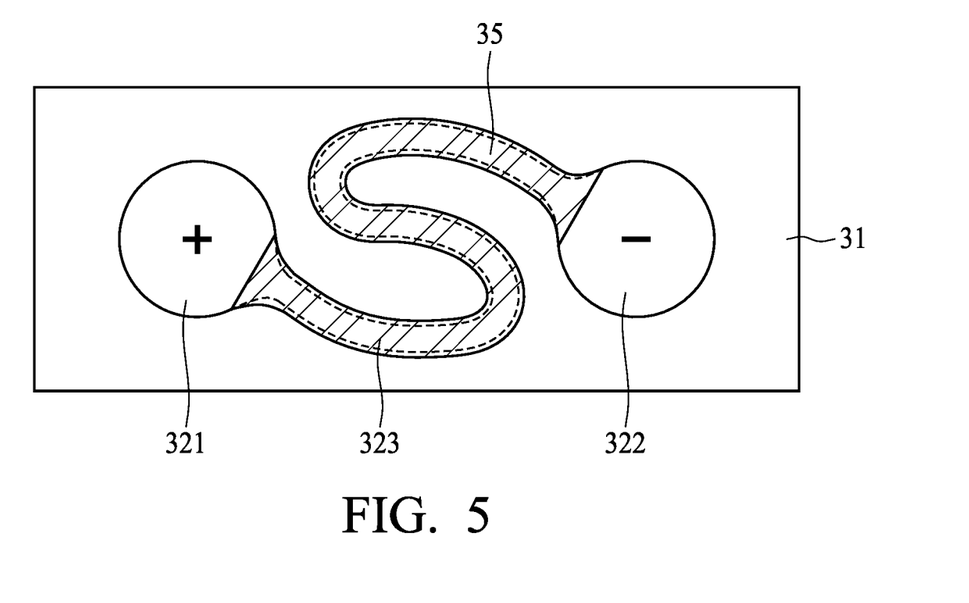
FIG. 5 shows a bottom view of a vaporizer in accordance with a second embodiment of the present application.
Figure 6:
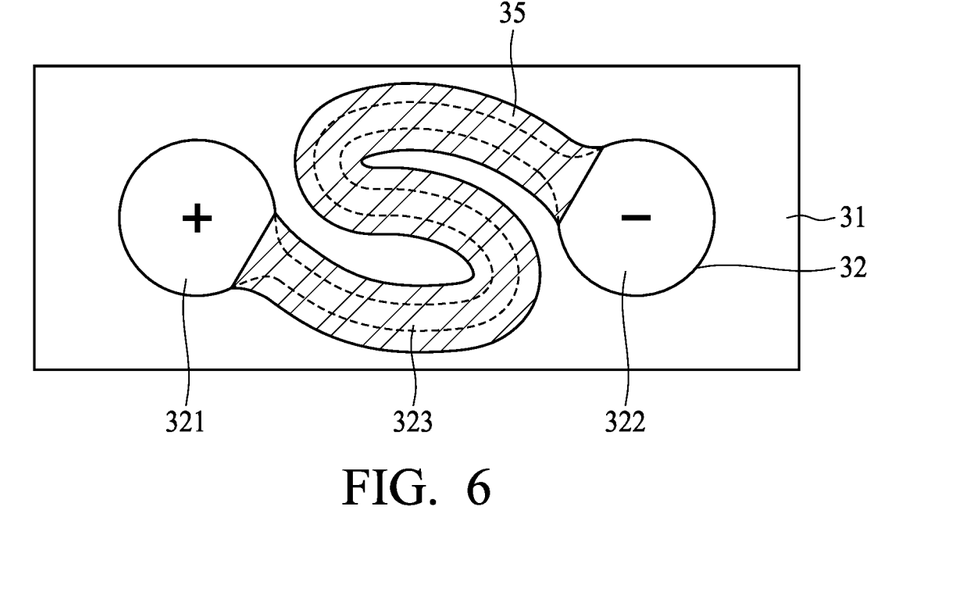
FIG. 6 shows a bottom view of a vaporizer in accordance with a third embodiment of the present application.
Figure 7:
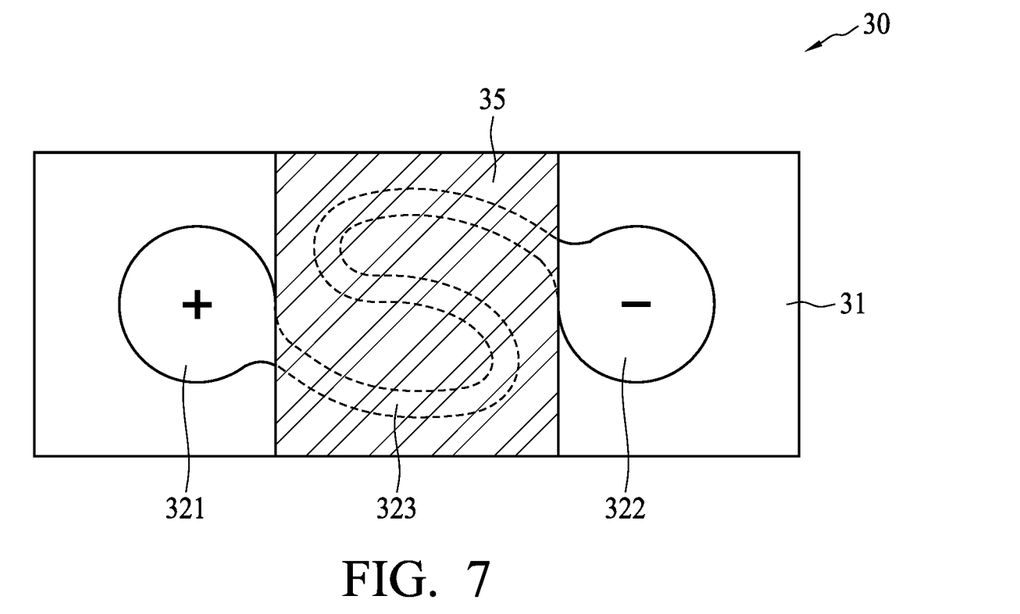
FIG. 7 shows a bottom view of a vaporizer in accordance with a fourth embodiment of the present application.
Figure 8:
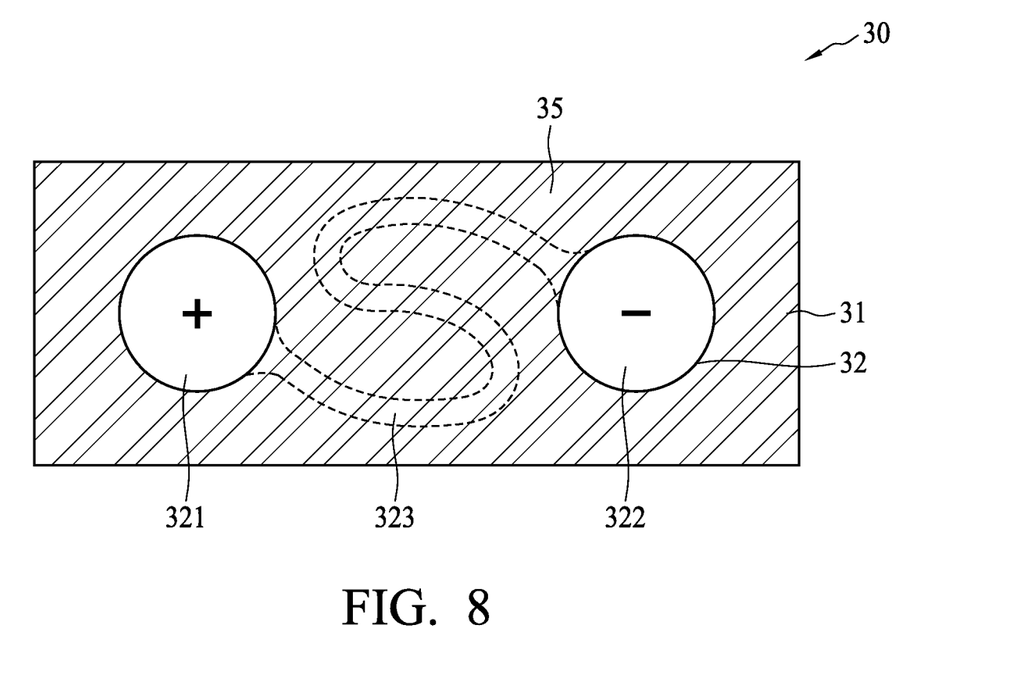
FIG. 8 shows a bottom view of a vaporizer in accordance with a fifth embodiment of the present application.

There are numerous variations that the porous cover layer 35 covers the electrically conductive connecting member 323. For example, according to a second embodiment as shown in FIG. 5, the porous cover layer 35 substantially extends along the electrically conductive connecting member (i.e., the wiring line) 323 and covers all portions of the electrically conductive connecting member 323 when viewed from the bottom thereof. The covering ratio in the second embodiment is about 130%. FIG. 6 illustrates a third embodiment that is similar to FIG. 5, and the difference therebetween lies in that covering area in the third embodiment is further extended. The covering ratio in the third embodiment is about 250%. FIG. 7 illustrates a a fourth embodiment that is similar to FIG. 4B, and the difference therebetween lies in that the fourth embodiment does not take misalignment issue into consideration. Thus, covering area extends further upwards and downwards to the upper and lower edges of the absorber 31. The covering ratio in the fourth embodiment is about 400%. In a fifth embodiment as shown in FIG. 8, the porous cover layer 35 covers entirety of the bottom surface 320 of the absorber 31 without covering the first electrode portion 321 and the second electrode portion 322. The covering ratio in the fifth embodiment is about 750%. Since there are numerous variations that the porous cover layer 35 covers the electrically conductive connecting member 323, it is impossible to illustrate each of the variations. The present application only uses FIGS. 4-8 as examples to illustrate inventive concept of the present application. It is intended that the present application encompasses all variations that the porous cover layer 35 covers at least a portion of the electrically conductive connecting member 323.

Table 1 shows data of vaporizers of Embodiments E1-E6 of the present application and Comparative Examples C1-C5, including material of heating element, porosity of porous cover layer, covering ratio, and power endurance. In addition, the vaporizer with cigarette oil is tested to evaluate amount of smoke and smell of taste by vision and olfaction. The amount of smoke is classified into "Large", "Medium", and "Small". The smell of taste is classified into "Rich", "Medium", and "Bland". All these tests are performed by the same person to prevent subjective sensual difference in case performed by different persons. For all of Embodiments E1-E6 and Comparative Examples C1-C5, the heating element uses Cu—Ni alloy. Both the absorber and the porous cover layer use aluminum oxide ($Al_2O_3$) with pore size distribution in a range of 10 μm-200 μm. Alternatively, silicon carbide (SiC), sodium silicate ($Na_2SiO_3$), ferrite, active carbon, kaolinite, halloysite, montmorillonite, calcium phosphate, zeolite, vermiculite, diatomite, palygorskite, sepiolite, perlite, or any combination thereof can be used as material of the absorber and the porous cover layer. The absorber has a thickness of 2 mm equivalent to 200 μm, and has a porosity of 71%. A thickness of the porous cover layer is equal to about 100 μm.

In the power endurance testing for the vaporizer, whether the heating element is blown after a power supply applies a power that lasts for 10 seconds is used to evaluate power endurance of the vaporizer. If the heating element is blown at a certain power after the power supply applies this power for 10 seconds, this power is defined as "failure power". The higher the failure power, the more excellent the power endurance of the vaporizer is. In the power endurance testing, the power supply employs Model No. GPC-30600 produced by GW INSTEK. In addition, different covering ratios are tested to determine whether covering area may impact smoke amount and taste smell of the vaporizer.

Comparative Example C1 conducts a test for a traditional vaporizer which does not include a porous cover layer. Because the vaporizer does not include a porous cover layer, airflow along a longitudinal direction (i.e., the longitudinal direction in FIG. 1 or 2) is superb, and thus the smoke amount is "Large" and the taste smell is "Rich". However, the heating element is not covered and is not protected, therefore the vaporizer has poor power endurance. The failure power is 12 watts (W). Also, it is predictable that the vaporizer has a short lifetime. Comparative Examples C2 and C3 include a porous cover layer with a porosity of 0%. In other words, the porous cover layer does not contain pores. Because the porous cover layer protects the heating element from contacting moisture and oxygen in air, avoiding oxidation of the heating element, the vaporizer endures higher power than Comparative Example C1. The failure power is 16 watts (W). On the other hand, the porous cover layer does not have pores, thus hindering airflow along the longitudinal direction, the smoke amount and the taste smell are "Small" and "Medium", respectively, which are more inferior than those in Comparative Example C1. Comparative Examples C4 and C5 both include a porous cover layer with a porosity of 33%. Owing to having pores in the porous cover layer, test results of Comparative Examples C4 and C5 show that failure power, smoke amount, and taste smell are better than those in Comparative Examples C2 and C3. It also indicates that structural designs of Comparative Examples C4 and C5 are sufficient to satisfy most users' requirements. However, for a few users, the smoke amount "Medium" still cannot provide enjoyment of visual and olfactory sensation.

Embodiments E1 and E2 of the present application both use a porous cover layer with a porosity of 55%. The failure power is 16 watts (W), the smoke amount is "Large", and the taste smell is "Rich". Obviously, compared to Comparative Examples C1-C5, Embodiments E1 and E2 of the present application can exceptionally provide enjoyment of visual and olfactory sensation, and lifetime of the vaporizer is extended. Embodiments E3 and E4 of the present application both use a porous cover layer with a porosity of 62%. Because Embodiments E3 and E4 has higher porosity than Embodiments E1 and E2, the failure power is increased further from 16 watts (W) to 18 watts (W). As to smoke amount and taste smell in Embodiments E3 and E4 and in Embodiments E1 and E2, they are the same, which are "Large" and "Rich", respectively. Inventors of the present application find that larger porosity facilitates in increase of power endurance because larger porosity assists in more airflow along the longitudinal direction in the porous cover layer. More airflow makes temperature of the heating element be lowered further, so that the absorber has a faster cigarette oil absorbing speed and has a higher cigarette oil absorbing efficiency, and dry combustion does not occur on the heating element. Specifically, larger porosity of the porous cover layer achieves a technical functional effect that the cigarette oil is absorbed to and permeates through the absorber and then onto the heating element at a faster speed, and thus the cigarette oil wets and overlays the entire heating element more quickly, therefore there is no phenomenon of dry combustion occurring on the heating element, and accordingly, power endurance of the vaporizer is increased. From this, it could be also known that when power endurance testing is conducted for the vaporizer, the failure power is the power at which the heating element is not wetted by cigarette oil, thus inducing phenomenon of dry combustion occurring on the heating element. Embodiments E5 and E6 of the present application both use a porous cover layer with a porosity of 75%. The failure power is 18 watts (W), the smoke amount is "Large", and the taste smell is "Rich". Please note that the porosity of the porous cover layer cannot be too large; otherwise, the vaporizer will have delamination problem due to poor bonding force between the porous cover layer and the heating element. In addition, too large porosity procures superbly excellent airflow beyond expectation. This may adversely and undesirably lead to a higher likelihood that oxygen in air along the longitudinal direction contacts the heating element more easily, and probability of oxidation of the heating element is increased. In an embodiment, the porosity of the porous cover layer is not more than 85%.

TABLE 1

| | Material of heating element | Porosity of porous cover layer | Covering ratio | Failure power at which vaporizer has phenomenon of dry combustion (watt) (lasting for 10 seconds) | Test for vaporizer | |
|---|---|---|---|---|---|---|
| | | | | | Smoke amount | Taste smell |
| C1 | Cu—Ni alloy | No porous cover layer | No porous cover layer | 12 W | Large | Rich |
| C2 | Cu—Ni alloy | 0% | 80% | 16 W | Small | Medium |
| C3 | Cu—Ni alloy | 0% | 300% | 16 W | Small | Medium |

TABLE 1-continued

| | Material of heating element | Porosity of porous cover layer | Covering ratio | Failure power at which vaporizer has phenomenon of dry combustion (watt) (lasting for 10 seconds) | Test for vaporizer | |
|---|---|---|---|---|---|---|
| | | | | | Smoke amount | Taste smell |
| C4 | Cu—Ni alloy | 33% | 80% | 16 W | Medium | Rich |
| C5 | Cu—Ni alloy | 33% | 300% | 16 W | Medium | Rich |
| E1 | Cu—Ni alloy | 55% | 80% | 16 W | Large | Rich |
| E2 | Cu—Ni alloy | 55% | 300% | 16 W | Large | Rich |
| E3 | Cu—Ni alloy | 62% | 80% | 18 W | Large | Rich |
| E4 | Cu—Ni alloy | 62% | 300% | 18 W | Large | Rich |
| E5 | Cu—Ni alloy | 75% | 80% | 18 W | Large | Rich |
| E6 | Cu—Ni alloy | 75% | 300% | 18 W | Large | Rich |

Table 1 shows that, with inclusion of a porous cover layer having a suitably predetermined porosity, the vaporizer of the present application has increased power endurance, and lifetime thereof is extended as well. For applications in vaporizing apparatus, such as electronic cigarette, the electronic cigarette generates a large amount and rich taste smell of smoke, satisfying high-requirement users. This cannot be achieved by traditional vaporizer without a cover layer.

Please further refer to Table 1. With observation on a same testing group (where the vaporizers have different covering ratios but have the same porosity, such as C2 and C3, C4 and C5, E1 and E2, E3 and E4, E5 and E6), it indicates that the covering ratios of 80% and 300% have the same smoke amount and the same taste smell. In other words, the covering ratio substantially does not have influence on the smoke amount and the taste smell. Without being bounded by any theory, it is presumed that because the porous cover layer 35 is extremely thin as compared to the absorber, and contains a large number of pores, the porous cover layer 35, in addition to protecting the heating element from contacting moisture and oxygen in air, allows sufficient air to enter thereinto from outside along all-around directions (in which, mainly along the longitudinal direction). Thus, no matter what the covering ratio is (i.e., 80% or 300%, for example, in Table 1), the porous cover layers in both cases achieve substantially the same temperature-lowering functional effect. Covering ration does not have influence on airflow along the longitudinal direction in the vaporizer 30. The heating elements 32 in both cases where the covering ratios are 80% and 300%, respectively, can equally achieve substantially the same functional effect that the material to be vaporized (i.e., cigarette oil) in the absorber 31 is vaporized to a specific extent. The covering ratio does no cause substantially obvious differences in terms of smoke amount and taste smell.

Since the porous cover layer has to protect the heating element from contacting moisture and oxygen in air, the covering ratio should be at least 50%, preferably in the range of 50%-800%. For instance, the covering ratio could be 300%, 130%, 250%, or 400%, as exemplified in the above described first to fourth embodiments, respectively, or 100%, 200%, 500%, 600%, or 700% in particular. The porous cover layer preferably has a thickness of 10 μm-200 μm, most preferably falling in the range of 90 μm-110 μm. By using such a thickness range, airflow along the longitudinal direction in the porous cover layer is not reduced. In practice, the porous cover layer could be made to have a thickness up to 600 μm, such as 300 μm, 400 μm, or 500 μm in particular. The porosity of the porous cover layer 35 ranges from 30% to 75%, such as 40%, 50%, 60%, or 70% in particular. Selection of this porosity range makes the vaporizer have the most optimized power endurance, smoke amount, and taste smell all together.

In an embodiment, based on product designs, the porous cover layer 35 and the absorber 31 can be of the same material or different materials. According to the present application, a material of the porous cover layer 35 and the absorber 31 is selected from aluminum oxide ($Al_2O_3$), silicon carbide (SiC), sodium silicate ($Na_2SiO_3$), ferrite, active carbon, kaolinite, halloysite, montmorillonite, calcium phosphate, zeolite, vermiculite, diatomite, palygorskite, sepiolite, perlite, or any combination thereof. For example, Embodiments E1-E6 of the present application and Comparative Examples C1-C5 in Table 1 all use the same material, i.e., aluminum oxide ($Al_2O_3$), for the porous cover layer 35 and the absorber 31.

To sum up, with inclusion of a porous cover layer having a suitably predetermined porosity to cover the heating element, the vaporizing apparatus and the vaporizer of the present application have increased power endurance, and lifetime thereof is extended as well. Also, a large amount and rich taste smell of smoke are obtained.

The above-described embodiments of the present invention are intended to be illustrative only. Numerous alternative embodiments may be devised by persons skilled in the art without departing from the scope of the following claims.

What is claimed is:

1. A vaporizer, comprising:
an absorber configured to absorb a material to be vaporized;
a heating element configured to heat and vaporize the material to be vaporized in the absorber, and including a first electrode portion, a second electrode portion, and an electrically conductive connecting member connected between the first electrode portion and the second electrode portion; and
a porous cover layer having a rectangular shape and covering at least a portion of the heating element without covering the first and second electrode portions, wherein a ratio of an area of the porous cover layer to an area of the electrically conductive connecting member is defined as a covering ratio, wherein the porous cover layer extends along the electrically conductive connecting member and covers all portions of the electrically conductive connecting member, wherein the covering ratio is at least 100%, wherein a porosity of the porous cover layer ranges from 30% to 75%, wherein an upper edge of the porous cover layer is distanced from an upper edge of the absorber by a gap (D) and a lower edge of the porous cover layer is distanced from a lower edge of the absorber by the gap (D), and wherein the gap (D) is 0.1 mm-0.6 mm.

2. The vaporizer of claim 1, wherein a material of the porous cover layer is selected from aluminum oxide, silicon carbide, sodium silicate, ferrite, active carbon, kaolinite, halloysite, montmorillonite, calcium phosphate, zeolite, vermiculite, diatomite, palygorskite, sepiolite, perlite, or any combination thereof.

3. The vaporizer of claim 1, wherein the covering ratio is in a range of 100%-800%.

4. The vaporizer of claim 1, wherein the porous cover layer covers the entirety of a bottom surface of the absorber without covering the first and second electrode portions.

5. The vaporizer of claim 1, wherein the porous cover layer has a thickness of 10 μm-200 μm.

6. The vaporizer of claim 1, wherein the porosity of the porous cover layer is 45%-75%.

7. A vaporizing apparatus, comprising:
a housing enclosing a reservoir for storing a material to be vaporized;
an absorber configured to absorb the material to be vaporized;
a heating element configured to heat and vaporize the material to be vaporized in the absorber, and including a first electrode portion, a second electrode portion, and an electrically conductive connecting member connected between the first electrode portion and the second electrode portion;
a porous cover layer having a rectangular shape and covering at least a portion of the heating element without covering the first and second electrode portions, wherein a ratio of an area of the porous cover layer to an area of the electrically conductive connecting member is defined as a covering ratio, wherein the porous cover layer extends along the electrically conductive connecting member and covers all portions of the electrically conductive connecting member, wherein the covering ratio is at least 100%, wherein a porosity of the porous cover layer ranges from 30% to 75%, wherein an upper edge of the porous cover layer is distanced from an upper edge of the absorber by a gap (D) and a lower edge of the porous cover layer is distanced from a lower edge of the absorber by the gap (D), and wherein the gap (D) is 0.1 mm-0.6 mm; and
a battery providing power to the heating element.

8. The vaporizing apparatus of claim 7, wherein a material of the porous cover layer is selected from aluminum oxide, silicon carbide, sodium silicate, ferrite, active carbon, kaolinite, halloysite, montmorillonite, calcium phosphate, zeolite, vermiculite, diatomite, palygorskite, sepiolite, perlite, or any combination thereof.

9. The vaporizing apparatus of claim 7, wherein the covering ratio is in a range of 100%-800%.

10. The vaporizing apparatus of claim 7, wherein the porous cover layer covers the entirety of a bottom surface of the absorber without covering the first and second electrode portions.

11. The vaporizing apparatus of claim 7, wherein the porous cover layer has a thickness of 10 μm-200 μm.

* * * * *